Oct. 2, 1951  R. PRESCOTT  2,569,949
RESISTANCE STRAIN GAUGE POTENTIOMETER BRIDGE CIRCUIT
Filed May 3, 1949

INVENTOR.
ROCHELLE PRESCOTT
BY
ATTORNEY

Patented Oct. 2, 1951

2,569,949

UNITED STATES PATENT OFFICE 2,569,949

RESISTANCE STRAIN GAUGE POTENTIOMETER BRIDGE CIRCUIT

Rochelle Prescott, Washington, D. C., assignor to the United States of America as represented by the Secretary of the Navy Application May 3, 1949, Serial No. 91,082

1 Claim. (Cl. 171—95)

The present invention relates to a potentiometer including a Wheatstone bridge controlled by strain gages.

Heretofore, when it was desired to measure very small voltages, difficulties were encountered due to the presence of adventitious voltages in the circuit, such as those due to accidental and indeterminate thermoelectromotive forces, and to variable voltage drops across poor connections, for example, that between a switch lever and its cooperating contact, or the sliding contact always present when a slide-wire is used.

An important object of the present invention is to provide a potentiometer in which the reference potential is derived from a circuit in which there are no switches or sliding contacts to give rise to some of the above effects. In addition the structures and connections are such that differences in temperature in this portion of the circuit are minimized, thus reducing thermoelectric effects to a minimum.

Another object is to provide a potentiometer including a pair of resistances varying simultaneously and equally in opposite senses, whereby their sum remains constant.

A further object is to provide a potentiometer including a Wheatstone bridge having strain gage resistors in at least two of its arms.

A general object is to provide a voltage measuring and/or controlling process and apparatus that do not depend on switches and/or sliding contacts.

Other objects and many of the attendant advantages of this invention will be appreciated readily as the same becomes understood by reference to the following detailed description, when considered in connection with the accompanying drawings, wherein.

Figure 1:
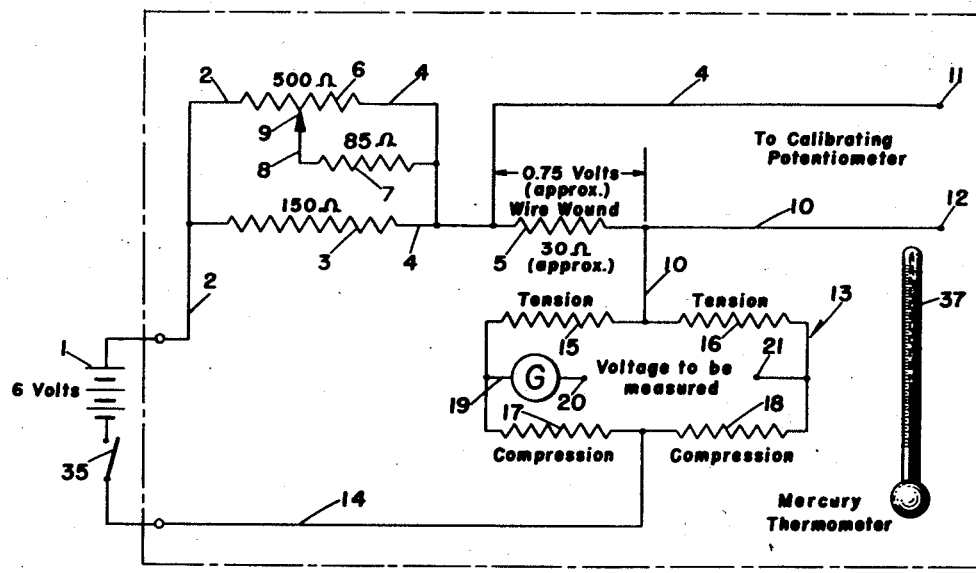
Fig. 1 is a circuit diagram of the complete potentiometer.

Referring first to Fig. 1, there is shown a source of electricity, such as the battery 1, one terminal of which is connected by conductor 2 to one end of a resistor 3 whose other end is connected through conductor 4 to the adjacent end of a second resistor 5.

A derived circuit is formed, in parallel with resistor 3, by connecting a resistor 6 between conductors 2 and 4, as shown. Another resistor 7, has one terminal connected to conductor 4, while its other terminal is connected through conductor 8 to a slider 9 adjustable along resistor 6.

Conductor 4 connects also to a terminal 11, while a companion conductor 10 leads from the remaining end of resistor 5 to a terminal 12, adjacent the terminal 11.

A Wheatstone bridge 13 is connected into the battery circuit, just described, through conductors 10 and 14, the latter having a switch 35 therein. The bridge 13 includes the permanently closed network of four resistance arms 15, 16, 17, and 18, and the bridge arm 19, in which are included the galvanometer G and the terminals 20 and 21.

Figure 2:
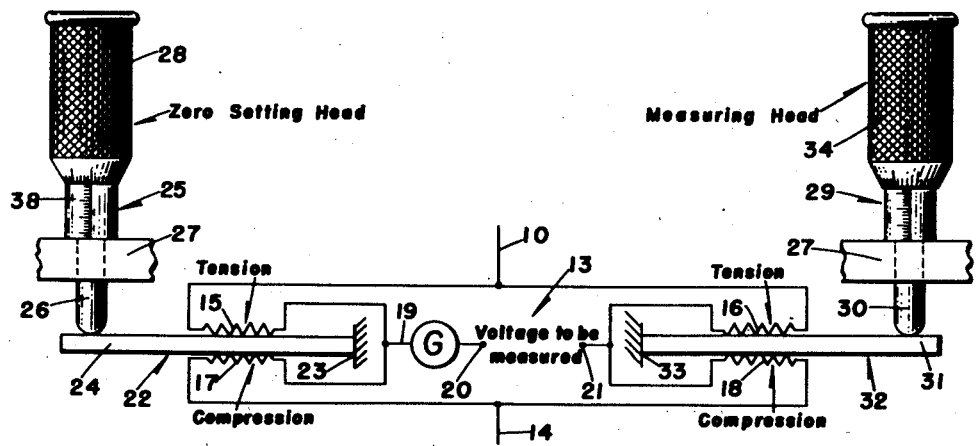
Fig. 2 is an elevation of the micrometer heads, with the strain gages controlled thereby shown diagrammatically.

Fig. 2 shows the bridge 13 and its adjusting means in detail. The resistors 15, 16, 17 and 18 are strain gage resistors, that is, they are designed to vary their respective resistances when subjected to tension or compression. Such resistors are well known as components of strain measuring devices, and are described in U. S. Patent 2,292,549, for example.

The strain gages are arranged in pairs, 15 and 17 being shown, for instance, as fastened on opposite sides of a flexible bar 22, which is held stationary by the support at one end 23, while the other end 24 abuts the spindle end 26 of an adjusting device 25, supported by a stationary element 27. It will be seen that the adjusting device, in its preferred form, is a micrometer-gage head of well-known type. The barrel 38 of this gage is secured rigidly to the member 27, while the sleeve 28, carried by the spindle 26, rotates about said barrel and also moves longitudinally of the latter in the way usual in micrometer gages.

An exactly similar structure exists or may exist in the companion adjusting device 29, whose spindle 30 abuts the end 31 of the flexible bar 32, which is held at its other end 33 by a stationary support. This bar 32 carries the strain gages 16 and 18 on opposite sides thereof, as shown. The sleeve 34 serves to adjust the spindle 30, and thus to control the flexure of bar 32.

While a specific mounting of the strain gages has been described in detail, it should not be assumed that no other arrangement of such gages is suitable. On the contrary, the type disclosed is merely illustrative and many other ways of disposing the strain gages, among which are some which dispense with the flexible bars entirely, are possible, for example, the type diagrammatically shown in Fig. 3.

Here a single annulus 36 replaces the two bars 22 and 32 of the Fig. 2 device, the micrometer heads remaining the same in structure and respective function as in Fig. 2. It will be noted that in this form the strain gages secured within the annulus will be in tension, while those outside will be in compression, when located as shown.

The operation of this apparatus is as follows:

The battery 1 is connected into the circuit by closing the switch 35, thus establishing a current flow through the system. The resistor 5, which may be of about 30 ohms resistance, serves as a calibration device, in the sense that the voltage across its terminals is adjusted to a predetermined convenient value, here indicated as 0.750 volt. It will be noted that leads 4 and 10 have terminals 11 and 12, suitable for connection to a calibrating potentiometer whereby the voltage across resistor 5 may be adjusted and/or measured accurately.

As the battery 1, here shown as a nominal 6-volt source, may vary in voltage, compensating means for such variation are provided. These include the resistor 6, of about 500 ohms with the slider 9 thereon, and the resistor 7, here 85 ohms, in the slider circuit. The effective value of the combined resistors 6 and 7 thus may vary continuously from a maximum of 500 ohms, to a minimum of a little less than 75 ohms. This combined resistance in turn is in parallel with resistor 3, of 150 ohms, and will make it possible to adjust the current through the circuit accurately, despite reasonable variations in battery voltage due to age, temperature, etc.

The primary purpose of such current adjustment is to keep the total current through the bridge network 13 constant, so that accurate voltage readings may be based thereon. It is well known that in a constant total current network of this kind, wherein the total current is divided between arms 15 and 17 on the one hand and arms 16 and 18 on the other, a linear difference of potential will exist between points in these two parallel conductors, that is, the voltage between points 20 and 21 in the present instance will vary directly as the resistance of resistors 15 and 16.

The balancing of the bridge involves reducing the galvanometer current to zero, and therefore the sensitivity of the said galvanometer determines the minimum noticeable voltage change.

In order to reduce the galvanometer current to zero, the bridge must be balanced by varying the resistors 15, 16, 17 and 18, but always in such way that 15+17 equals 16+18 equals a definite known constant. To this end the resistors mentioned are the strain gages, shown in Fig. 2. In each pair of such gages, one will increase exactly the same amount the other decreases, thus maintaining their sum constant, and maintaining a constant current in the corresponding bridge arm.

By turning the sleeve or head 28, a zero setting may be made. This is done by providing a short-circuiting connection between the terminals 20 and 21 to maintain them at the same potential, and then turning sleeve 28 in one direction or the other until the galvanometer deflection is reduced to zero.

If now this connection is removed, and a voltage to be measured, lying, of course, within the proper range, is applied between terminals 20 and 21, say from a thermo-couple or any other source, this will cause a current flow in the galvanometer, which may again be reduced to zero, this time by turning the sleeve 34 in the proper direction.

Figure 3:
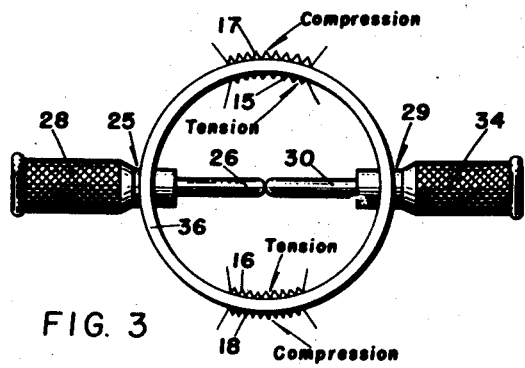
Fig. 3 shows a modified form of strain gage support and micrometer heads.

The same procedure is followed in the modified structure shown in Fig. 3. The head 28 is again the "zero setter," the bridge being balanced, with the gap 20—21 short-circuited as before, by turning head 28 until the galvanometer current becomes zero, whereupon the short-circuit is removed and the voltage to be measured is substituted, across terminals 20 and 21, and the galvanometer current again reduced to zero, this time by the head 34, from which the voltage reading is then made.

As the resistances of the strain gage resistors 15, 16, 17 and 18 are known or knowable in terms of the readings of the micrometer head scales, these readings will thus make it possible to determine the voltage across terminals 20 and 21.

The bridge network is permanently closed and has no sliding contacts or switches therein, hence no spurious or parasitic voltages can be introduced, due to such causes.

In order further to minimize errors, it may be found desirable to mount all critical parts, so far as feasible, in a wooden box, on or adjacent to a massive metal base plate, such as one made of aluminum, whereby the heat insulation provided by the wooden box, in conjunction with the good heat conductivity of the base plate, will tend to maintain all the associated elements at the same temperature. This will practically eliminate errors due to thermoelectric effects and will also reduce errors due to changes of resistance with temperature of the resistors.

Therefore the strain gages, galvanometer shunts etc. and cold junctions of any thermocouples used are so mounted and enclosed. A mercury thermometer 37 may be provided for checking.

Another important advantage of the present apparatus is that the impedance across the galvanometer terminals remains always the same, and may be so selected that the damping of the galvanometer is just short of critical, so that the time lost in waiting for the pointer to come to rest is minimized. A value of damping short of the critical one is desirable because in general a dead-beat condition of a sensitive galvanometer causes the pointer to come to rest too slowly and as a rule, time is saved by allowing the pointer to swing once or twice through its null position.

Summarizing, to read a voltage after the apparatus has been adjusted properly, it is necessary merely to insert said voltage between terminals 20 and 21 and then to adjust the micrometer head 34, to zero deflection of the galvanometer, and compute the unknown voltage from the micrometer reading.

Obviously many modifications and variations of the present invention are possible in the light of the above teachings. It is therefore to be understood that within the scope of the appended claim the invention may be practiced otherwise than as specifically described.

What is claimed is:

A potentiometer comprising a Wheatstone bridge wherein all the arms consist solely of strain gages, said gages being connected permanently into a closed circuit, means for applying a constant voltage across two opposite points of said circuit, a deformable element, two electrically adjacent gages in series being mounted on opposite sides thereof to vary in resistance to equal and opposite extents, upon deformation of said element, a galvanometer and spaced terminals adapted to receive a source of voltage to be measured in series with the galvanometer across the other two opposite points of the bridge, and calibrated means for stressing the remaining two gages to restore the balance of the bridge.

ROCHELLE PRESCOTT.

REFERENCES CITED

The following references are of record in the file of this patent:

UNITED STATES PATENTS

| Number | Name | Date |
|---|---|---|
| 345,755 | Wirt | July 20, 1886 |
| 2,471,105 | Gustafsson et al. | May 24, 1949 |

FOREIGN PATENTS

| Number | Country | Date |
|---|---|---|
| 587,096 | Great Britain | Apr. 14, 1947 |

OTHER REFERENCES

Publication I, "Product Engineering," vol. 16, September 1945, 608–613. (Copy in Patent Office Library TJ,I.P93.)